United States Patent
Plasse et al.

(10) Patent No.: US 6,700,805 B2
(45) Date of Patent: Mar. 2, 2004

(54) ELECTRIC SUPPLY DEVICE, IN PARTICULAR FOR MOTOR VEHICLE ON-BOARD NETWORK

(75) Inventors: Cédric Plasse, Garches (FR); Jean-Michel Bazet, Maisons Alfort (FR); David Huart, Paris (FR); Marcel Vogelsberger, Wissous (FR)

(73) Assignee: Valeo Equipments Electriques Moteur, Creteil (FR)

( * ) Notice: Subject to any disclaimer, the term of this patent is extended or adjusted under 35 U.S.C. 154(b) by 94 days.

(21) Appl. No.: 09/979,019

(22) PCT Filed: Mar. 27, 2001

(86) PCT No.: PCT/FR01/00928
§ 371 (c)(1),
(2), (4) Date: Nov. 15, 2001

(87) PCT Pub. No.: WO01/76052
PCT Pub. Date: Oct. 11, 2001

(65) Prior Publication Data
US 2002/0159278 A1 Oct. 31, 2002

(30) Foreign Application Priority Data
Apr. 4, 2000 (FR) .............................. 00 04278

(51) Int. Cl.[7] .............................. H02M 7/00; H02M 3/18
(52) U.S. Cl. ........................................ 363/67; 363/61
(58) Field of Search .............................. 363/59, 60, 61, 363/65, 67, 68, 69, 70, 71

(56) References Cited

U.S. PATENT DOCUMENTS 3,694,731 A    9/1972  Cherry ......................... 363/61
5,398,182 A  * 3/1995  Crosby ......................... 363/68
5,532,917 A  * 7/1996  Hung ............................ 363/67
5,956,243 A    9/1999  Mao ............................. 363/68

FOREIGN PATENT DOCUMENTS

EP    0 534 153 A1    3/1993
EP    0 884 820 A2   12/1998
NL    8 700 173 A     8/1988

* cited by examiner

Primary Examiner—Jessica Han
(74) Attorney, Agent, or Firm—Liniak, Berenato & White

(57) ABSTRACT

An electrical power supply apparatus, especially for a motor vehicle electrical system, comprising at least two power supply sources (1, 2) which are both connected between ground and a supply line, and each of which comprises at least one induced current winding and a bridge of rectifier elements (P1, P2), characterised in that one of the two said sources comprises an auxiliary bridge of rectifier elements of positive type ($P_{aux1}$), the other one comprising an auxiliary bridge of rectifier elements of negative type ($P_{aux2}$), with means (I; Dc1, Dc2, Dc3; Id), connected to each of the said two bridges and being adapted to be controlled for the purpose of:

in a first state, connecting the two auxiliary bridges ($P_{aux1}$; $P_{aux2}$) in series, the rectified voltage supplied to the power supply line then being the sum of the voltages supplied by the induced current winding or windings of each of the two sources and then rectified, in a second state, blocking the connection between the two auxiliary bridges ($P_{aux1}$; $P_{aux2}$), the two sources then supplying the power supply line in parallel.

12 Claims, 6 Drawing Sheets

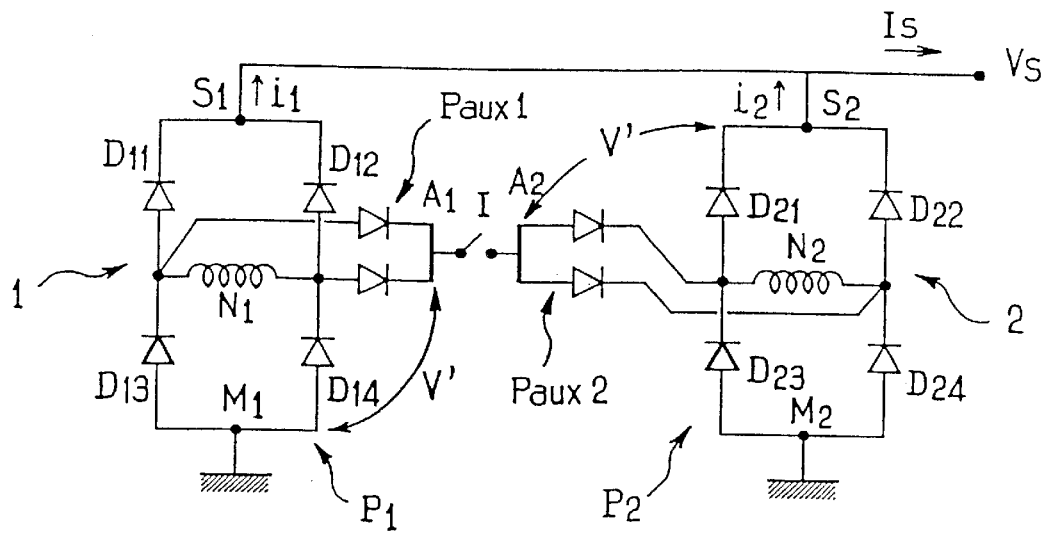
FIG_1
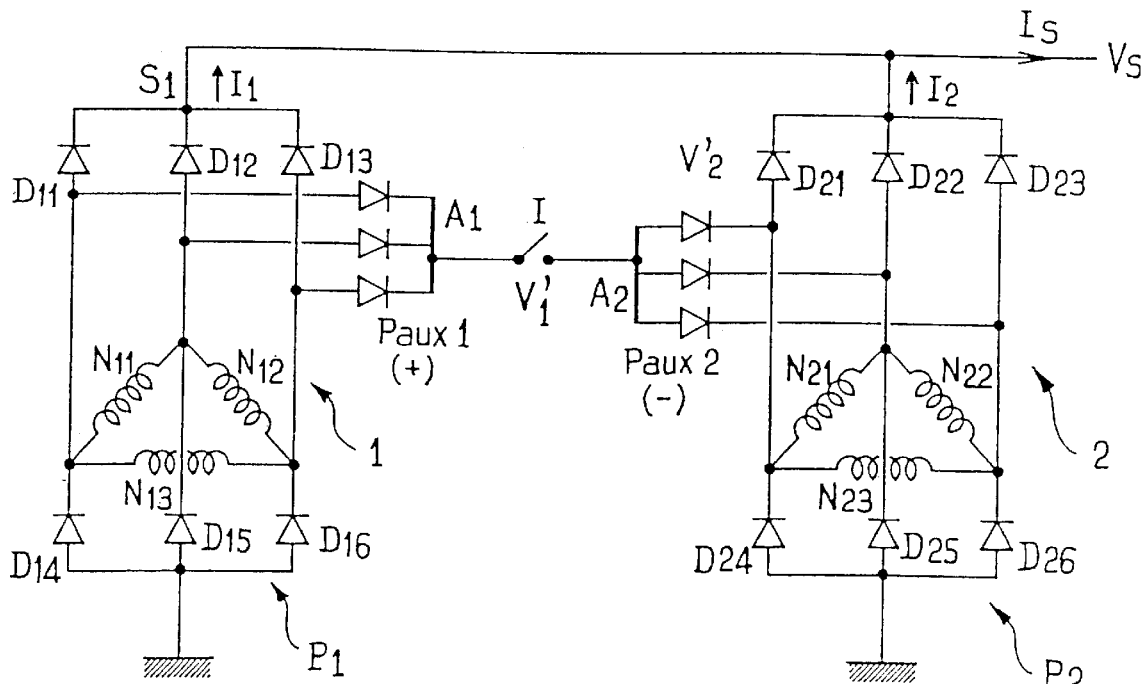
FIG_2

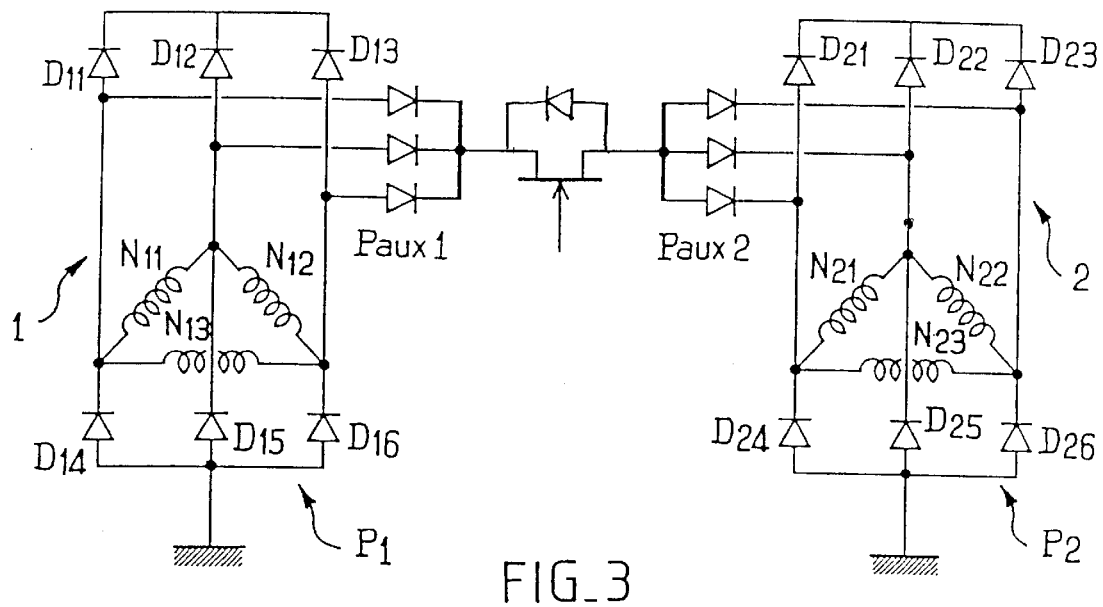
FIG_3
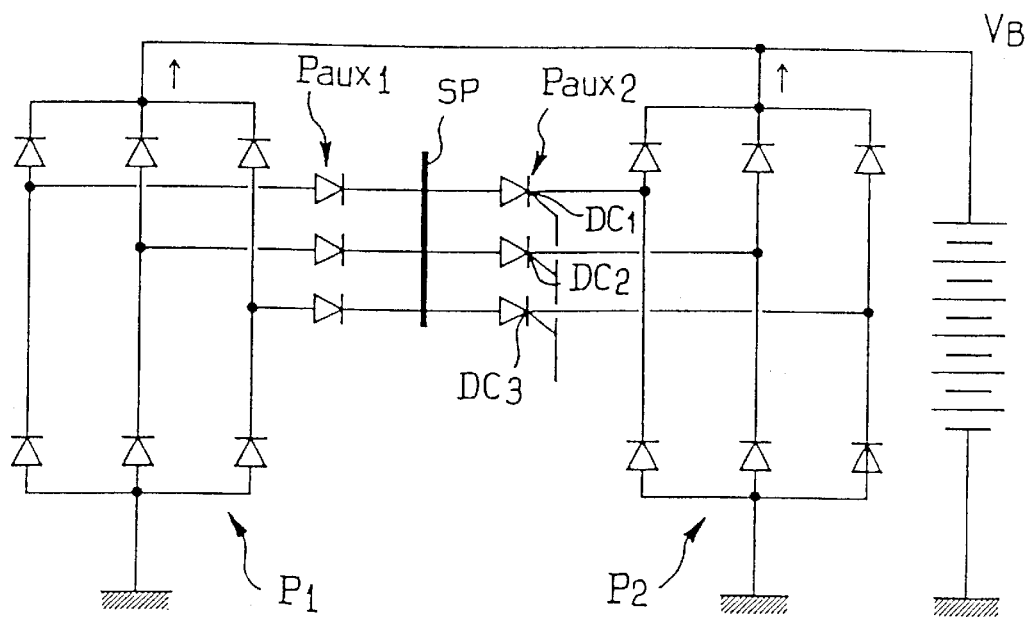
FIG_5

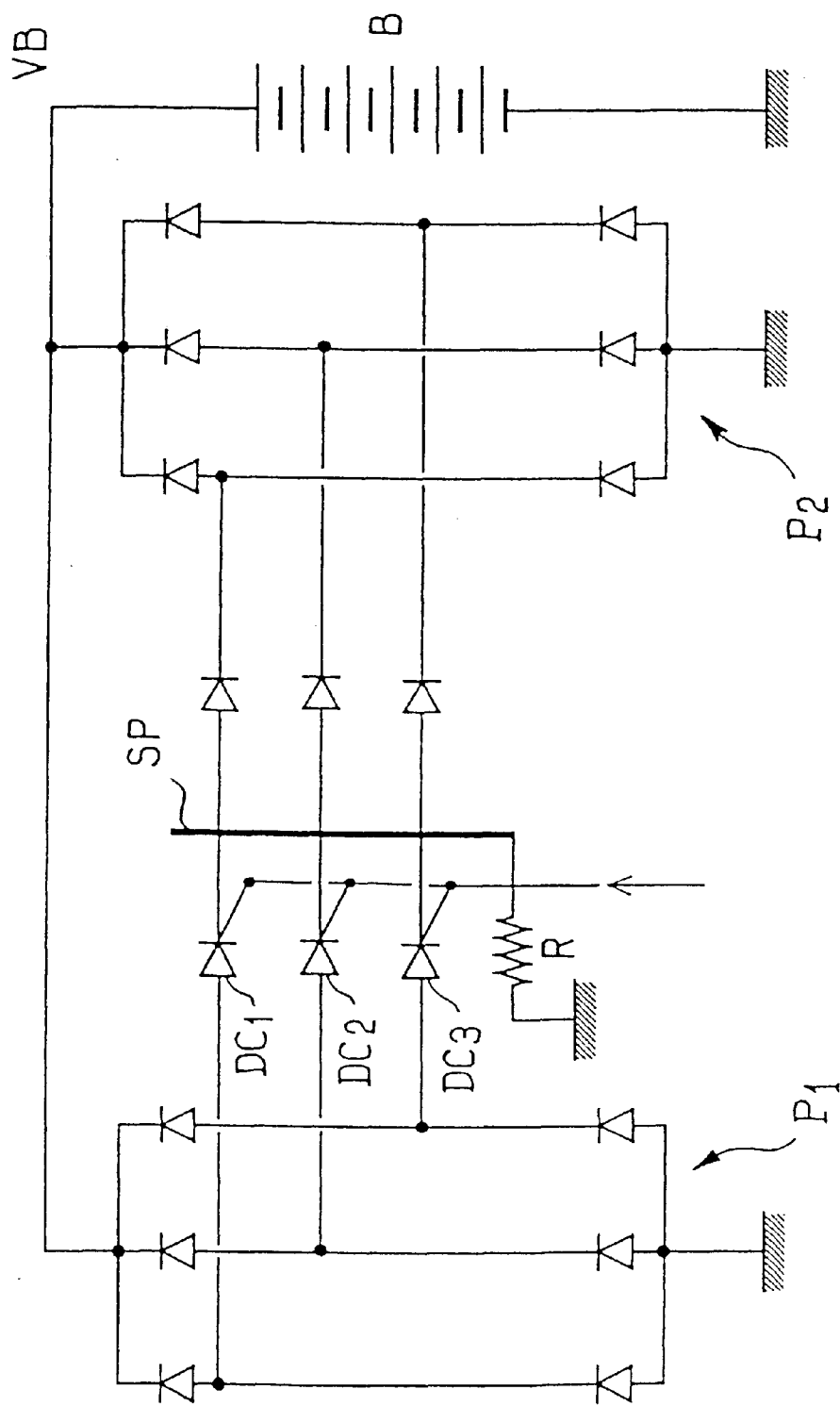
FIG._4

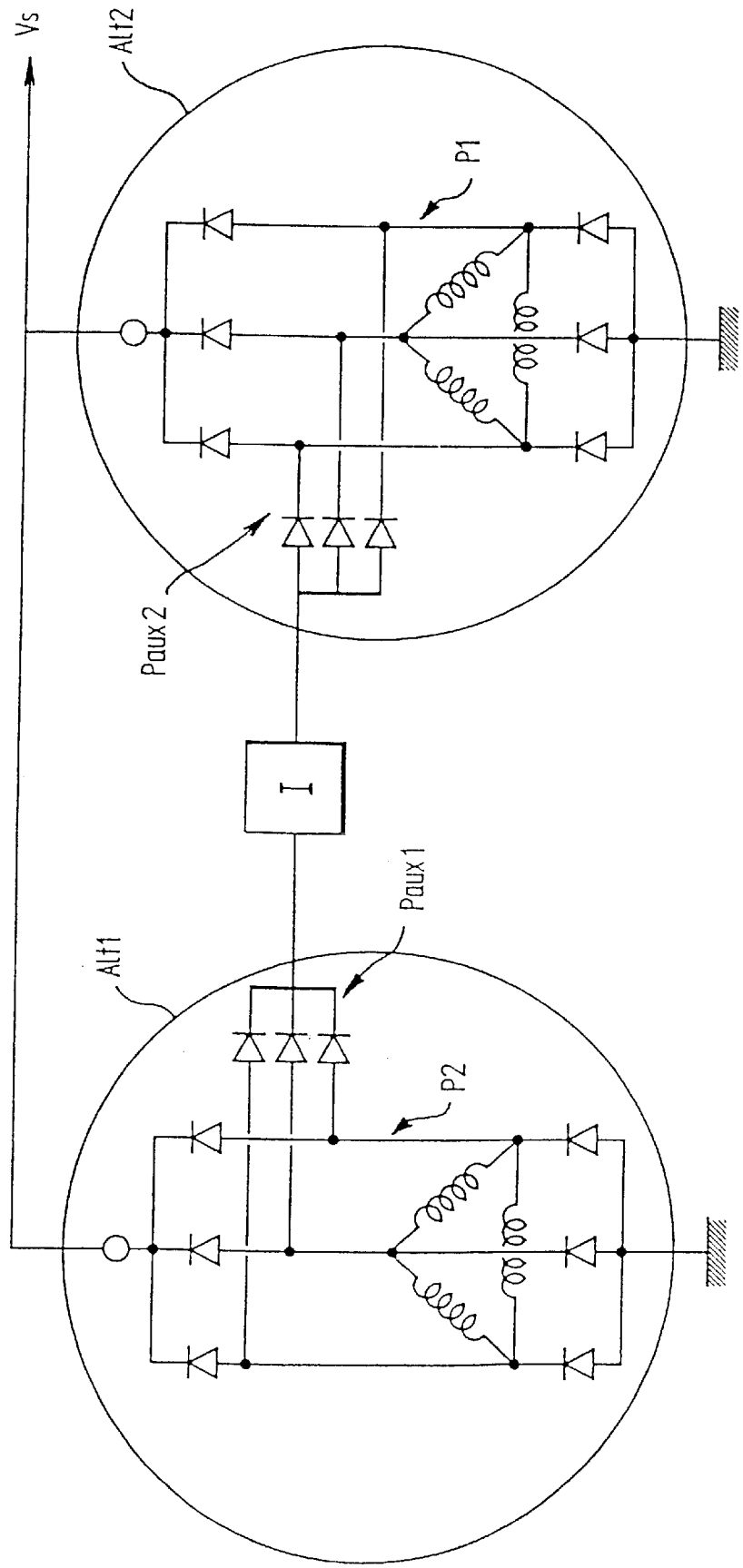
FIG_6

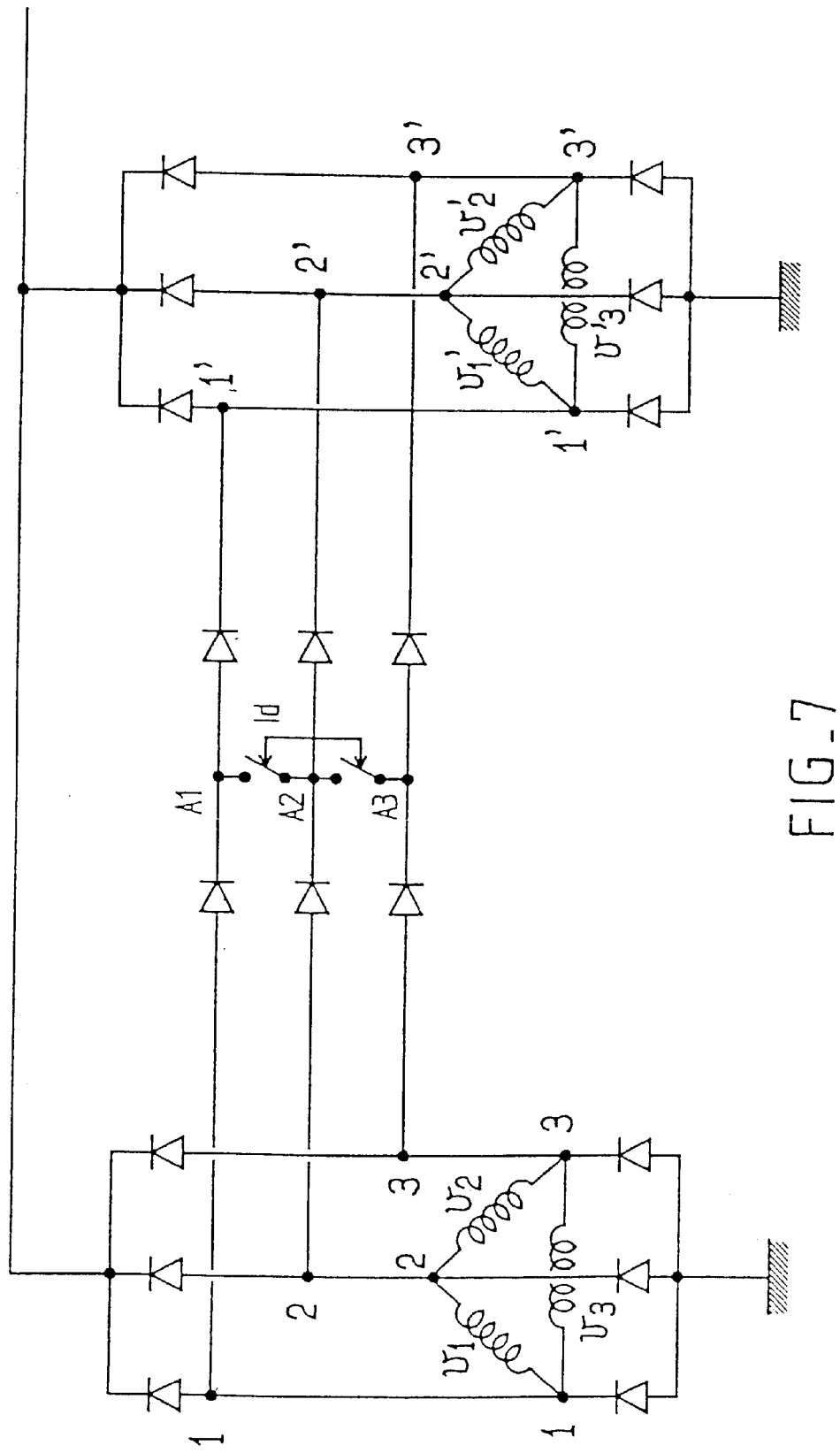
FIG_7

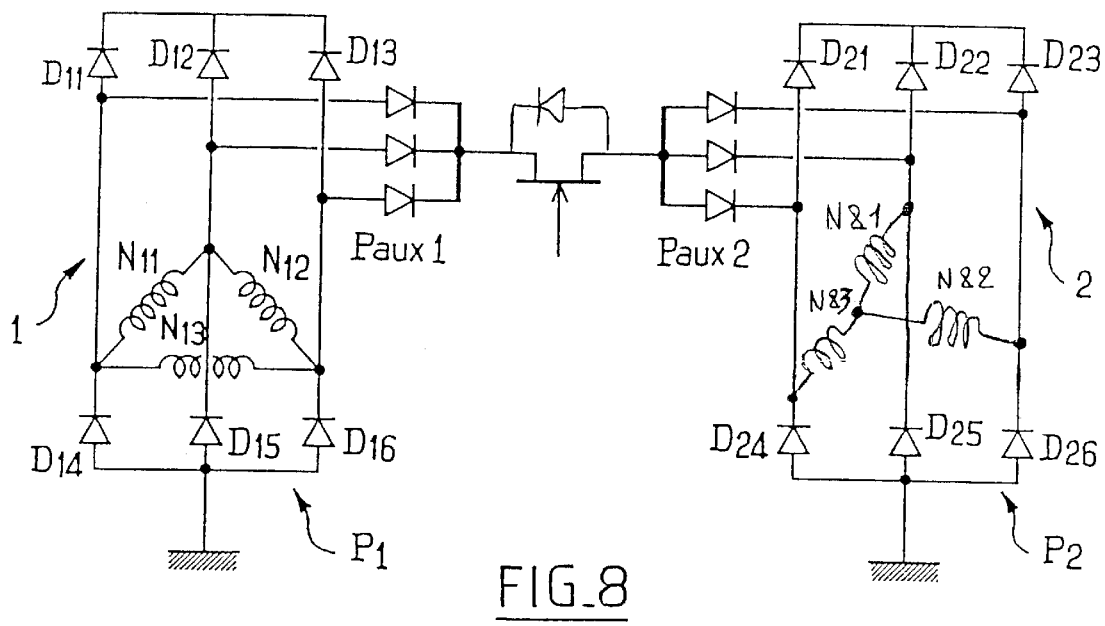
FIG_8

ELECTRIC SUPPLY DEVICE, IN PARTICULAR FOR MOTOR VEHICLE ON-BOARD NETWORK

BACKGROUND OF THE INVENTION

1. Field of the Invention

The present invention relates to an electrical power supply apparatus, especially for a motor vehicle electrical system.

2. Description of Related Art

One of the problems encountered with alternators which feed the electrical systems of motor vehicles lies in the fact that they are driven by the heat engine at variable speeds of rotation.

The performance of these alternators consequently varies according to the running mode of the engine, whereas the electrical system would require to be fed at constant power.

In order to overcome this drawback without prohibitive increases in weight, size and cost of the generator, various apparatuses have been proposed.

All of these are based on one of the two following principles:

driving of the alternator through a variable ratio device.

double alternators or an alternator with double three-phase windings, connected in series at low running modes of the engine and in parallel at high running modes of the engine.

The arrangements known at this time remain complex and expensive, or else they have reduced performance.

SUMMARY OF THE INVENTION

One object of the invention is to overcome these disadvantages.

To this end, it proposes an electrical power supply apparatus, especially for a motor vehicle electrical system, comprising at least two power supply sources which are both connected between ground and a supply line, and each of which comprises at least one induced current winding and a bridge of rectifier elements, characterised in that one of the two said sources comprises an auxiliary bridge of rectifier elements of positive type, the other one comprising an auxiliary bridge of rectifier elements of negative type, with means, connected to each of the said two bridges and being adapted to be controlled for the purpose of:

in a first state, connecting the two auxiliary bridges in series, the rectified voltage supplied to the power supply line then being the sum of the voltages supplied by the induced current winding or windings of each of the two sources and then rectified, in a second state, blocking the connection between the two auxiliary bridges, the two sources then supplying the power supply line in parallel.

Such an apparatus is preferably completed by the features as set out as follows:

the two sources are three-phase sources;

a control means is a controllable interrupter interposed between the two auxiliary bridges;

a control means is a controlled diode interposed between the two auxiliary bridges;

a control means is a transistor of CMOS type, interposed between the two auxiliary bridges;

a control means comprises control diodes which constitute rectifier elements of one and/or the other of the two auxiliary bridges;

the diodes of the two auxiliary bridges are carried by a common support;

the two sources are two alternators on which the two auxiliary bridges are respectively mounted;

the two sources are synchronous sources, the rectifier elements of the two auxiliary bridges being connected in pairs and providing the connection between the phases of the two corresponding sources, the branches connecting two rectifier elements of each of the two auxiliary bridges being connected in pairs by means constituting an interrupter, these interrupter means constituting the control means;

the two sources are synchronous three-phase sources, and in that the control means comprises at least one double interrupter;

the induced current windings consist, respectively, of a delta connected induced current winding and a star connected induced current winding;

the delta connected induced current winding has a number of turns per slot which is equal to the number of turns per slot in the star connected induced current winding multiplied by the square root of the number of phases in the electrical machine.

BRIEF DESCRIPTION OF THE DRAWINGS

Further features and advantages of the invention will appear more clearly from the following description, which is purely by way of illustration and is not limiting, and which should be read with reference to the attached drawings, in which:

FIG. 1 is a diagrammatic representation of an electrical power supply apparatus with two single-phase sources, in accordance with one possible embodiment of the invention;

FIG. 2 is a diagrammatic representation of an electrical power supply apparatus with two three-phase sources, in accordance with one possible embodiment of the invention;

FIGS. 3 to 8 illustrate five electrical power supply apparatuses with three-phase sources, in accordance with other possible embodiments of the invention.

DETAILED DESCRIPTION OF THE PREFERRED EMBODIMENTS

The apparatus shown in FIG. 1 has two single-phase sources, 1, 2, the induced current windings N1 and N2 of which are shown, together with the rectifier bridges P1, P2 which are associated with them.

The induced current windings N1 and N2 are either the secondaries of two transformers, or else two stator windings of the same alternator.

Each of the two bridges P1, P2 comprises, as is conventionally known per se, two half bridges of diodes, one of which is positive and the other negative.

In FIG. 1, the positive diodes of the bridge P1 are referenced D11 and D12, while its negative diodes are referenced D13 and D14; as to the positive diodes of the bridge P2, these are referenced D21 and D22, while the negative diodes are referenced D23 and D24.

Each of the two sources is associated in addition with an auxiliary rectifier bridge $P_{aux1}$, $P_{aux2}$.

More precisely, the two diodes of the auxiliary bridge $P_{aux1}$ are connected to the induced current winding N1 through their anode, while the two diodes of the auxiliary bridge $P_{aux2}$ are connected to the induced current winding N2 through their cathode, the auxiliary bridges $P_{aux1}$ and $P_{aux2}$ therefore constituting an auxiliary bridge of the positive type and an auxiliary bridge of the negative type, respectively; the common point of the two diodes of the rectifier bridge $P_{aux1}$, referenced A1, is connected to the point, referenced A2, which is common to the two diodes of the rectifier bridge $P_{aux2}$, through a controlled interrupter referenced I.

FIG. 1 also indicates the current Is delivered by the apparatus to the electrical network of the vehicle, the potential Vs of this network, the currents i1 and i2 that flow respectively through the two rectifier bridges P1, P2, and the points M1, S1 and M2, S2 through which the said rectifier bridges P1, P2 are connected to ground and to the electrical network.

Such a circuit works in the following way.

In the case where the interrupter I is open, the two systems are connected in parallel and the two auxiliary bridges connected on each of the main bridges then perform no function. The current Is is then the sum of the currents Is1 and Is2. The voltage Vs is equal to the voltage V' between M1 and A1, or between M2 and A2—the voltage at the point A1 is the image of that at the point S2, just as the voltage at the point A2 is the image of that at the point M2.

In the case where the interrupter I is closed, the potentials at the points A1 and A2 are identical and have a value V'. The diodes D23 and D24 are then polarised in reverse, and consequently isolate the winding N2 from ground. The voltage Vs is then the sum of the two voltages generated by the two windings N1 and N2, that is to say 2V'.

The diodes D11 and D12 are in this case also polarised in reverse and isolate the winding N1 from the output voltage Vs.

The example shown in FIG. 1 in the case of single-phase sources can of course be generalised to the case of sources with n phases, and in particular to the case of three-phase sources.

One possible embodiment with three-phase sources is shown in FIG. 2.

The three-phase windings of the first source are referenced N11, N12, N13, while those of the second source are referenced N21, N22 and N23.

The positive diodes of the bridge P1 associated with the first source are referenced D11, D12, D13, while its negative diodes are referenced D14, D15 and D16.

As to the positive diodes of the bridge P2 associated with the second source, these are referenced D21, D22, D23, while its negative diodes are referenced D24, D25 and D26.

The two auxiliary bridges, one of positive type and the other of negative type, are referenced $P_{aux1}$ and $P_{aux2}$. The diodes of the bridge $P_{aux1}$ are connected to the induced current windings of the source 1 through their anodes, while the diodes of the bridge $P_{aux2}$ are connected to the induced current windings of source 2 through their anodes. A controlled interrupter I is interposed between the points A1 and A2, which are respectively the point to which the diodes of the bridge $P_{aux1}$ are connected through their cathodes, and the point to which the diodes of the bridge $P_{aux2}$ are connected through their anodes.

Such a device works in the following way.

In the case where the interrupter I is closed, the voltage V'1 measured at the point A1 is the rectified voltage delivered by the first three-phase source (source 1). The value of the voltage Vs is therefore the sum of V'1 and V'2, where V'2 is the rectified voltage delivered by the second three-phase source (source 2). The voltage Vs being greater than V'1, the positive diodes of bridge 1, namely D11, D12, D13, are polarised in reverse; they therefore isolate the three-phase system 1 from the output voltage Vs, the current I1 being zero in consequence. The negative diodes of the bridge 2, namely D24, D25, D26, are themselves polarised by V'1 which is greater than 0; they are all therefore inhibited, and isolate the three-phase system 2 from earth.

Once the interrupter I is open, the two three-phase systems once more operate in parallel, and the current Is is then the sum of I1 and I2.

It is of course possible to envisage numerous other alternative embodiments.

In particular, the interrupter I may be replaced either by a control diode or by a transistor T of the CMOS type, as shown in FIG. 3.

In this last case, the transistor T of the CMOS type must be oriented in such a way that the intrinsic diode which is associated in parallel with it by construction must be opposed to the diodes of the two auxiliary bridges.

In another variation, the interrupter I may with advantage be replaced by three control diodes Dc1, Dc2, Dc3 which are also the three diodes of the positive auxiliary bridge $P_{aux1}$. These three control diodes are in this case all governed together so as to be either conductive or non-conductive.

The two supports of diodes of the auxiliary bridges can then be replaced by a single support Sp, as shown in FIG. 4, which is for example a metal plate connected to ground through a resistor R by which it is polarised.

The three control diodes Dc1, Dc2, Dc3 can of course also be located, in whatever way is most convenient for location or to satisfy the demands of the design of the electronic circuit, on the negative auxiliary bridge $P_{aux2}$ (FIG. 5).

As shown in FIG. 6, the invention can be used with advantage in the series-parallel switching of two separate rectifying alternators ALT1, ALT2.

For convenience of fitting of the two auxiliary bridges $P_{aux1}$ and $P_{aux2}$, these are preferably disposed separately on each of the two alternators ALT1, ALT2. Switching can in this case be achieved either by means of a separate device (rupture element I in FIG. 6), or by means of controlled diodes disposed on one of the two auxiliary bridges. In the case of this particular application, the apparatus is of particular advantage due to the fact that the conductor on the outside of the two alternators carries a direct current.

As will have been understood, the diodes of the apparatuses proposed may be replaced by Zener type diodes with an appropriate peak voltage, or with diodes of the so-called Shottky type.

FIG. 7 shows another version of the invention, in which the apparatus is controlled by means of a double interrupter mounted between the points A1, A2, A3 on branches which connect together the diodes of the bridge $P_{aux1}$ with the diodes of the bridge $P_{aux2}$.

If the double interrupter is open, the six diodes of the two auxiliary bridges $P_{aux1}$, $P_{aux2}$ are connected in series in pairs between the windings of a common phase, and therefore perform no function because the points 1 and 1', 2 and 2', and 3 and 3', are at the same potential. The apparatus in this case operates in parallel configuration.

In the case where the double interrupter is closed, the apparatus works in series in the manner shown in FIG. 2. This version is applicable on in the case where there is perfect synchronism between the two three-phase systems.

In another version, it is possible with advantage to replace the three-phase delta connected windings of the second source, referenced N21, N22 and N23 in FIG. 3, by a star connected winding as shown in FIG. 8 with the references N81, N82 and N83.

In order to establish equality between the electromotive forces of the two induced current windings, the number of turns in each slot of the two induced current windings is such that:

$$NT=(n)^{1/2} \times NE,$$

where:

NT=number of turns per slot in the delta connected induced current winding.

NE=number of turns per slot in the star connected induced current winding.

n=number of phases.

This embodiment, which combines a delta connected induced current winding with a star connected induced current winding, associated with the series-parallel circuits which are described in particular in connection with FIGS. 2 to 6, offer the advantage of reducing the peak-to-peak variation in the voltage at which the vehicle electrical system is supplied, at the output of the rectifying device, this being true whether the two induced current windings are connected in series or whether they are in parallel.

This is of particular advantage especially in the case where the battery is situated a substantial distance from the alternator, because the effect of voltage loss through the capacity of the battery is reduced.

Another advantage lies in the reduction in the magnetic noise resulting in a reduction in vibrations created by interaction between the rotor and stator of the electrical machine.

The result is a fluctuation of the order of four times the number of phases of each induced current winding, or for example an order of twelve for a winding of the three-phase type.

Circuits of the type having two delta connected induced current windings only have a reduced magnitude of fluctuation equal to twice the number of phases in each induced current winding, so that, for example, it is of the order of six for a three-phase winding.

In all of the embodiments described above, the star connected and delta connected induced current windings are of course interchangeable.

This invention may also, of course, be applied to alternators of motor vehicles of the type described above, but having a wound stator with large diameter conductors in the form of bars. Such a stator winding is described for example in the document WO-92/06257. These bar conductors substantially fill the slots of the body of the stator, and are generally in the form of hairpins with a cross section which is preferably, round, square or rectangular. Conductors in the form of bent bars, for example, may advantageously replace the hairpins.

Thanks to the invention, such a wound stator with large conductors in the form of bars will be able to be cooled easily.

The arrangement of the stator in the casing 14 according to the invention is preferably applicable to motor vehicle alternators or to electrical machines of the "starter-alternator" type, known per se, which are adapted to work as required either as a starter motor or as an alternator. For more details, reference should be made to Application FR-00 031 31 filed on Mar. 10, 2000.

What is claimed is:

1. An electrical power supply apparatus, especially for a motor vehicle electrical system, comprising at least two power supply sources (1, 2) which are both connected between ground and a supply line, and each of which comprises at least one induced current winding and a bridge of rectifier elements (P1, P2), wherein one of the two said sources comprises an auxiliary bridge of rectifier elements of positive type ($P_{aux1}$), the other one comprising an auxiliary bridge of rectifier elements of negative type ($P_{aux2}$), with control means (I; Dc1, Dc2, Dc3; Id), connected to each of the said two bridges and being adapted to be controlled for the purpose of:

in a first state, connecting the two auxiliary bridges ($P_{aux1}$; $P_{aux2}$) in series, the rectified voltage supplied to the power supply line then being the sum of the voltages supplied by the induced current winding or windings of each of the two sources and then rectified, in a second state, blocking the connection between the two auxiliary bridges ($P_{aux1}$; $P_{aux2}$), the two sources then supplying the power supply line in parallel.

2. Apparatus according to claim 1, characterised in that the two sources (1, 2) are three-phase sources.

3. Apparatus according to claim 1, wherein said control means is a controllable interrupter (I) interposed between the two auxiliary bridges.

4. Apparatus according to claim 1, wherein said control means is controlled diode interposed between the two auxiliary bridges.

5. Apparatus according to claim 1, wherein said control means is a transistor of CMOS type, interposed between the two auxiliary bridges.

6. Apparatus according to claim 1, wherein said control means comprises control diodes (Dc1, Dc2, Dc3) which constitute rectifier elements of one and/or the other of the two auxiliary bridges.

7. Apparatus according to claim 6, characterised in that the diodes of the two auxiliary bridges ($P_{aux1}$; $P_{aux2}$) are carried by a common support (Sp).

8. Apparatus according to claim 1, characterised in that the two sources are two alternators (ALT1, ALT2) on which the two auxiliary bridges are respectively mounted.

9. Apparatus according to claim 1, characterised in that the two sources are synchronous sources, the rectifier elements of the two auxiliary bridges ($P_{aux1}$; $P_{aux2}$) being connected in pairs and providing the connection between the phases of the two corresponding sources, the branches connecting two rectifier elements of each of the two auxiliary bridges ($P_{aux1}$; $P_{aux2}$) being connected in pairs by means (Id) constituting an interrupter, these interrupter means constituting the control means.

10. Apparatus according to claim 9, characterised in that the two sources are synchronous three-phase sources, and in that the control means comprises at least one double interrupter (Id).

11. Apparatus according to claim 1, characterised in that the induced current windings consist, respectively, of a delta connected induced current winding (N11, N12, N13) and a star connected induced current winding (N81, N82, N83).

12. Apparatus according to claim 11, characterised in that the delta connected induced current winding (N11, N12, N13) has a number of turns per slot which is equal to the number of turns per slot in the star connected induced current winding (N81, N82, N83) multiplied by the square root of the number of phases in the electrical machine.

* * * * *